United States Patent [19]

Strauss

[11] Patent Number: 5,032,208
[45] Date of Patent: Jul. 16, 1991

[54] PROCESS FOR MANUFACTURING A BUNDLE OF TUBES

[76] Inventor: Horst Strauss, 8, l'Ile de France Street, L'Isle Adam, France

[21] Appl. No.: 208,095

[22] Filed: Jun. 17, 1988

[30] Foreign Application Priority Data

Jun. 19, 1987 [FR] France ................... 87 08622

[51] Int. Cl.$^5$ ............................................. B32B 31/18
[52] U.S. Cl. ..................................... 156/251; 156/267;
156/296; 52/808; 269/287; 428/36.9; 428/188
[58] Field of Search ............... 156/296, 251, 433, 180,
156/267; 428/36.9, 188; 52/808; 269/287;
83/29

[56] References Cited

U.S. PATENT DOCUMENTS

| | | |
|---|---|---|
| 1,465,653 | 8/1923 | Olander . |
| 1,708,462 | 4/1929 | Bodman ........................ 52/808 X |
| 2,477,852 | 8/1949 | Bacon ........................... 156/296 X |
| 3,234,639 | 2/1966 | Dietzsch ........................ 29/157 R |
| 3,625,102 | 12/1971 | Fumio Shino . |
| 3,664,906 | 5/1972 | Hartig . |
| 3,773,584 | 11/1973 | Dietzsch et al. ............. 156/296 X |
| 3,792,562 | 2/1974 | Gilliam . |
| 3,877,690 | 4/1975 | Owens ......................... 269/287 X |
| 4,155,800 | 5/1979 | Wilson . |
| 4,276,249 | 6/1981 | Holladay . |
| 4,351,680 | 9/1982 | Kohn . |
| 4,588,543 | 5/1986 | Huebner ....................... 156/296 X |

FOREIGN PATENT DOCUMENTS

| | | |
|---|---|---|
| 670027 | 9/1966 | Belgium . |
| 1209725 | 1/1966 | Fed. Rep. of Germany ...... 156/296 |
| 2129813 | 12/1971 | Fed. Rep. of Germany . |
| 2836031 | 2/1980 | Fed. Rep. of Germany . |
| 435693 | 11/1967 | Switzerland . |
| 891110 | 3/1962 | United Kingdom . |
| 2059802 | 4/1981 | United Kingdom . |

Primary Examiner—Caleb Weston
Assistant Examiner—Michele K. Yoder
Attorney, Agent, or Firm—Cushman, Darby & Cushman

[57] ABSTRACT

This invention relates to the manufacturing of a monobloc bundle of straight tubes, laterally contiguous and fixed together. Initially, the bundle is made of tubes which are laterally contiguous and which are not fixed together. An apparatus is used to fix together the tubes at one or at both ends. This apparatus consists of a means to form the bundle of tubes laterally contiguous but not fixed together, of a means to cut the bundle perpendicular to the axis of the tubes and of means to fix together the ends of the tubes in the plane of the cut. The bundle of tubes can be used to make the core of a sandwich panel.

18 Claims, 2 Drawing Sheets

PROCESS FOR MANUFACTURING A BUNDLE OF TUBES

BACKGROUND OF THE INVENTION

1. Field of Invention

This invention relates to the manufacturing of a monoblock bundle of straight tubes laterally contiguous, which can be used as the core of a sandwich panel.

A typical application, but not limited to, of the invention is the manufacturing of panels which can be used as light walls with a good transversal compression strength, for example panels for truck bodies, containers and diverse walls.

2. Brief Description of the Prior Art

The problem in the manufacturing of a monoblock bundle of tubes laterally contiguous is the assembly of the tubes and this assembly is known to be done by bonding the tubes one against the others on their full length.

SUMMARY OF INVENTION

This technique is very expensive and limits considerably the manufacturing of these bundles and of the corresponding subsequent panels.

The invention proposes a new technique where the tubes are fixed together at only one end or at only their two ends.

This new concept allows the manufacturing of the bundle of tubes in a very simple way.

According to the invention, a bundle of tubes is manufactured with the tubes laterally contiguous but not fixed, the tubes are then fixed together at one or at both ends in such a way that the triangular zone limited by each group of three tubes in contact, stays open.

In one realization the tubes ends are fixed together by means of a layer containing a bonding agent, for example a thermoset adhesive which is heated to be activated and hardens in a very short time.

In another realization the ends of the tubes are fixed together by the application of a layer containing or made of a thermofusible material which is heated above the fusion point and penetrates by capillarity between the tubes where the tubes are in contact.

In another realization the tubes are cut and fixed together simultaneously by cutting the bundle of tubes transversally with a cutting tool, for example a heated filament, which starts to melt the tubes where they are cut, preferably with a reciprocating movement in the plane of the cut.

In another realization the bundle of tubes is cut transversally by a laser beam which is immediately followed by a metal sheet which does not adhere to the tubes for example by means of an anti-adhesive coating.

It is possible to cut transversally a bundle of tubes which are fixed at both ends so that after the cut two bundles are obtained with the tubes fixed at only one end.

Such a bundle can be easily bent, to make for example the core of a curved panel.

Generally a layer or a fabric is applied and bonded on the ends of the tubes which are fixed together to improve the strength of the bundle and to act as a support for the fixation of a skin.

To manufacture a bundle of tubes according to this invention, an advantageous apparatus consists of means of forming a bundle of tubes laterally contiguous but not fixed together, of means of cutting transversally this bundle of tubes and of means of fixing together the ends of the tubes which are in the plane of the cut.

Preferably, as indicated above, the cutting means and the fixation means are incorporated in a single means.

A preferred realization for the apparatus consists of a gutter in which the tubes are laid down and pressed against each other, of means of pushing the bundle of tubes longitudinally along the axis of the gutter in such a way that the bundle of tubes protrudes from the extremity of the gutter and can be cut.

EXAMPLE OF MANUFACTURING

Making of layers with a tubular structure, 2,000 mm long, 500 mm wide and 25 mm thick (the thickness is also the length of the tubes). These layers can be used as the core of a sandwich panel with composite skins made of polyester resin reinforced with glassfibers.

a) 18,000 polypropylene extruded tubes with a 8 mm diameter, a 0.18 mm wall thickness and a length of 2,100 mm are required to make a bundle with a 2,000×500 mm section. These tubes are laid down into the gutter which has a 2,000×500 mm section. During the introduction of the tubes the section of the gutter is larger to facilitate this introduction.

b) on the opposite side of the opening of the gutter a sliding table pushes the bundle of tubes so that its extremity protrudes 5 to 7 mm from the plane of the cut, c) a heated filament installed on a carriage moving parallel to the gutter opening plane cut the bundle of tubes in a plane perpendicular to the axis of the tubes. The filament has a reciprocating movement in its axis, this movement has an amplitude of 20 to 30 mm, when a thermoplastic tube like a polypropylene tube is cut by a heated filament a flange is formed where the tube is cut. Each tube in the bundle is in contact with six other tubes which are around it, during the cut the flanges interpenetrate and weld together during the cooling. This weld at the ends of the tubes is strong enough to keep the tubes together.

the first cut of a bundle is used to straighten the extremity of the bundle so that it can be used as a reference plane.

d) the moving table pushes the bundles of tubes on a distance of 25 mm, e) the heated filament cuts through the bundle and simultaneously welds together the ends of the tubes, a layer 2,000×500 mm with a thickness of 25 mm is made, f) the layer is covered on one side by a veil of 80 gr/m$^2$, made of glass fibers and thermoplastic fibers, both the layer and the veil are installed under the table of a pneumatic press having a short travel of say 30 to 50 mm. The upper table is fixed and heated to 260° C. by circulating oil. When approching the heated table the flanges of the tubes heat up, become fluid and penetrate the structure of the veil. When the tables of the press are at a distance of 24.5 mm at their four corners, the press opens rapidly, g) in a very short time, below one second, the layer is placed in another pneumatic press and pressed between two cold tables to stabilize the shape of the layer. The veil is strongly welded to the tubular structure and can carry the loads between the tubes and the skins of a panel by means of the polyester matrix, h) after several minutes of cooling the two last operations f) and g) are carried out again on the other face of the layer, the layer is ready to receive the skins made of glass reinforced polyester resin on one or both sides.

The skins can be made of any material: metal sheets, plywood, thermoplastic composite, etc.

The bond between the skins and the core can be obtained by moulding over the core or by bonding at room temperature or at elevated temperatures.

Dimensions, shapes and thicknesses of the layers can be very different without almost any limits. It is even possible to include openings in the layer by partially replacing the tubes by a shape made of expanded thermoplastic, lighter and cheaper than the tubes.

The tubes can be made of metal, paper, thermoplastics, thermoset resins charged or not charged, reinforced or not reinforced. Dimensions can be varied, it is even possible to make a layer with different tube diameters and wall thicknesses to adjust its strength to the loads carried by the panel.

As indicated above, the section of the gutter can be different by a large amount.

The heated filament can be replaced by a band saw. In the case the tubes are made of thermoset resins, paper or metal and when the saw is used, the weld of the flanges is not made.

In the case the tubes are made of thermoplastics the heat developed by the friction of the band saw can be sufficient to melt the tubes and make the welding. If the heat developed is not sufficient, a heated steel band can follow the band saw and make the welding by melting the tubes locally.

When the tubes are cut by means of a saw, the side of the bundle which has been cut can be covered by a veil, a mat, a fabric made of fiberglass or any material corresponding to the needs. These layers are bonded or thermobonded to the tubes. The bonding has the same effect as the welding.

The travel of the bundle in the gutter can be varied from a few millimeters to several centimeters depending on the final thickness of the cut bundle.

The attached drawings illustrate preferred embodiments of the invention.

DETAILED DESCRIPTION OF THE PREFERRED EMBODIMENTS

Figure 1:
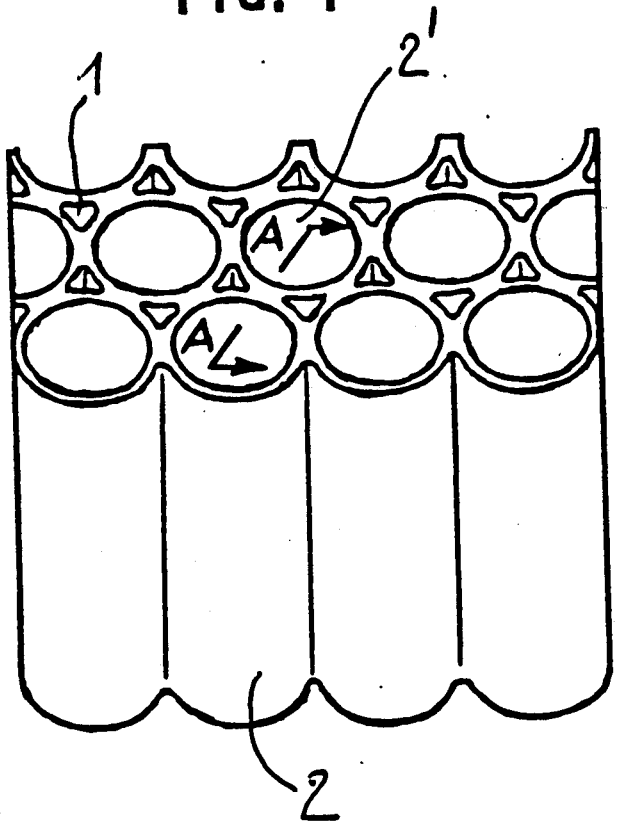
FIG. 1 is a partial view of a bundle of thermofusible tubes according to the invention.
Figure 2:
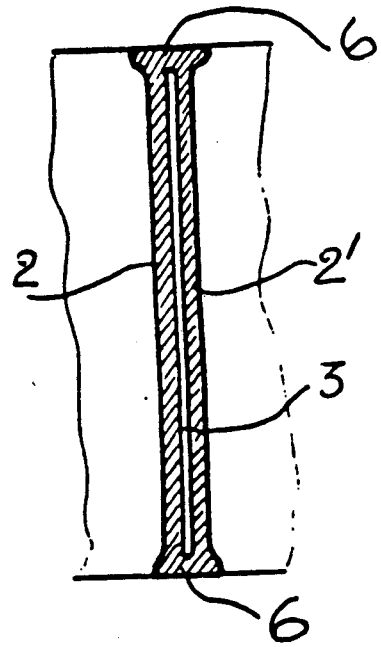
FIG. 2 is a cross-sectional view of the bundle of tubes taken along axis A—A in FIG. 1 in which the tubes are welded by thermofusion.
Figure 3:
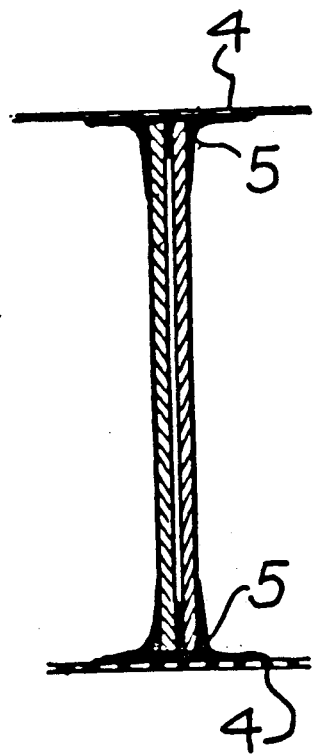
FIG. 3 is a cross-sectional view of the bundle of tubes taken along axis A—A in FIG. 1 in which the tubes are not thermofusible.
Figure 4:
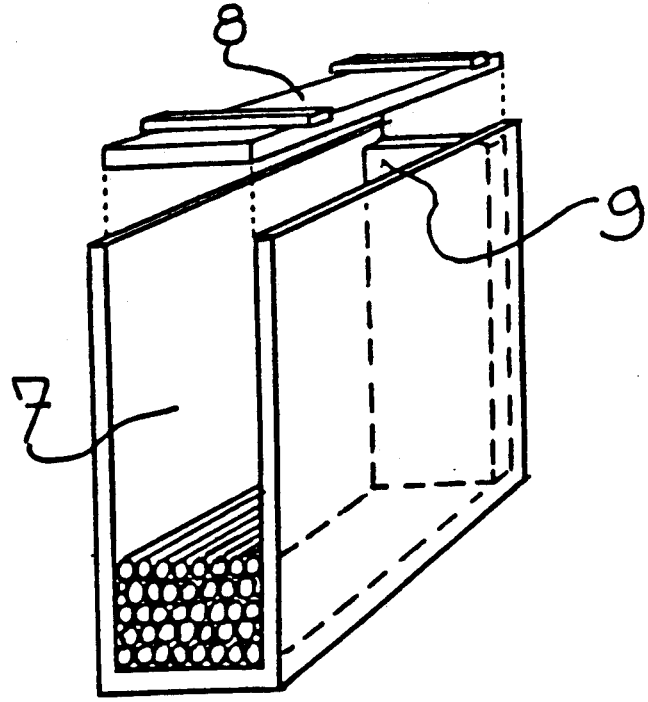
FIG. 4 represents an apparatus used to make the bundle of tubes.
Figure 5:
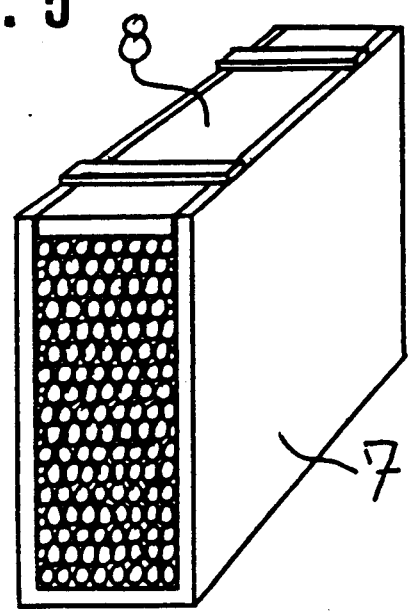
FIG. 5 shows the plurality of non-adhered tubes in a gutter of the apparatus of FIG. 4.
Figure 6:
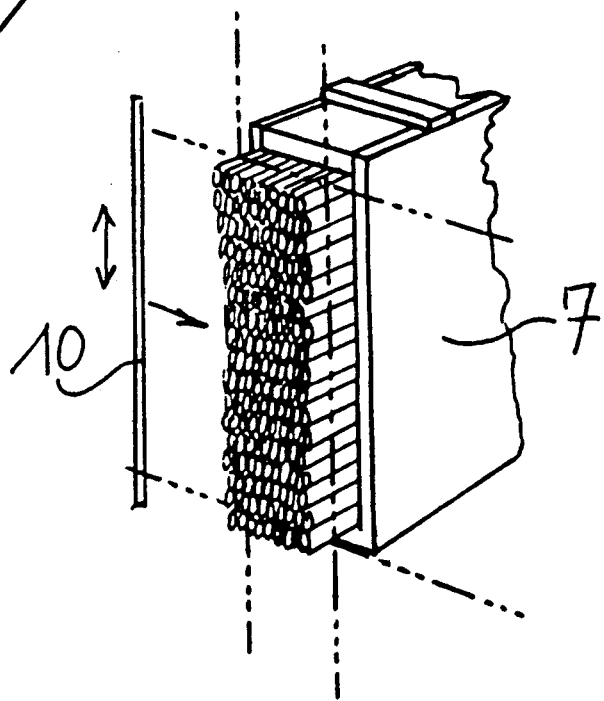
FIG. 6 illustrates the tubes with one end protruding from the gutter.
Figure 7:
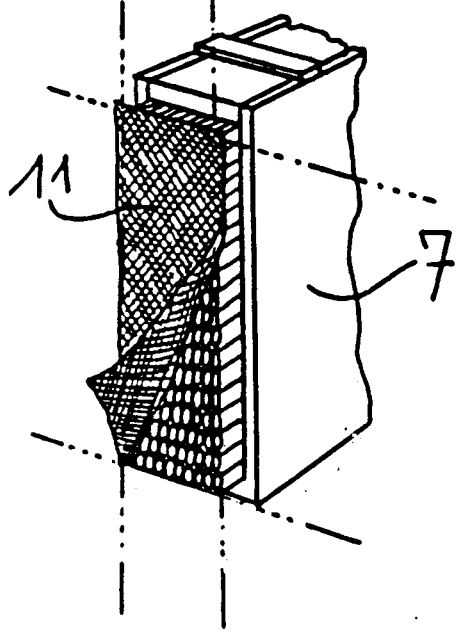
FIG. 7 shows the tubes receiving on their protruding ends a layer containing a bonding agent.

The preferred embodiments of the invention will now be described with reference to the accompanying drawings:

FIG. 1 is a partial view of a bundle of thermofusible tubes made according to the invention: the ends of the tubes have been melted making flanges welded together but leaving voids identified by number 1;

FIG. 2 is a section along A—A on FIG. 1; two contiguous walls are shown in 2 and 2', the tubes being welded at their ends by thermofusion, the welded flanges are shown in 6. A space between the walls is shown in 3, it must be understood that the tubes are practically in contact and that the space is shown only to illustrate the fact that the tubes are welded only at their ends 6;

FIG. 3 is a section equivalent to FIG. 2 but shows that in case the tubes are not thermofusible, the fixation is obtained by the application of either a fabric containing a bonding agent or a layer containing a thermofusible material heated above its fusion point, this is shown in 4, in 5 the figure illustrates the fact that the bonding agent represented by black spots fix together the ends of the tubes;

FIG. 4 represents an apparatus used to make the bundle of tubes, this apparatus consists of a gutter 7, a cover 8 to press the tubes into the gutter to maintain them in contact with one another and a pushing table 9 to push the bundle along the axis of the gutter;

FIG. 5 shows the bundle of tubes in the gutter;

FIG. 6 shows the bundle of tubes with one end protuding from the gutter, ready to be cut in the plane shown by the dotted lines by means of a reciprocating, heated filament 10;

FIG. 7 shows the bundle of tubes receiving on its protuding end a layer containing a bonding agent to fix together the ends of the tubes.

I claim:

1. A method of manufacturing a monoblock bundle of laterally contiguous straight tube sections interconnected at a longitudinal end, comprising the steps of:

providing a gutter having a longitudinal axis, first and second substantially vertical side walls and a substantially vertical end wall, said end wall being disposed substantially perpendicularly to said first and second side walls and being slidable along said longitudinal axis of said gutter relative to said first and second side walls;

providing a plurality of elongated, straight and laterally contiguous tubes, each said tube having a longitudinal axis, said tubes being free from attachment to one another;

placing said plurality of elongated tubes into said gutter so that said longitudinal axes of said tubes are substantially parallel to said longitudinal axis of said gutter;

pressing said tubes disposed within said gutter vertically downwardly against one another;

moving said end wall of said gutter longitudinally relative to said side walls of said gutter so as to move said tubes longitudinally until said tubes protrude by a predetermined amount from one longitudinal end of said gutter;

providing means for cutting said tubes along a plane substantially perpendicular to the longitudinal axis of said tubes;

cutting ends of said tubes which protrude from said one end of said gutter along a plane substantially perpendicular to said longitudinal axis of said tubes so as to produce a plurality of straight tube sections of a particular length having one longitudinal end at said cut and another longitudinal end abutting said end wall of said gutter; and fixing the plurality of tube sections together at said cut end, wherein said step of cutting ends comprises making a first cut and further comprising the step of, after fixing said tube sections together at one end, again moving said end wall of said gutter longitudinally relative to said side walls of said gutter so as to move the fixed tube sections longitudinally in the gutter until the fixed ends of said tubes protrude by a given length from said one end of said gutter; and making a second cut in the same plane as the first cut to produce a plurality of remaining laterally contiguous straight tube sections of a same length having one longitudinal end at the second cut and another longitudinal end abutting said end wall and a monoblock bundle of laterally contiguous straight tube sections of a same length, fixed together at one end and having a second end at said second cut.

2. A method as in claim 1, wherein said step of cutting the tubes comprises initially cutting the ends of the tubes protruding from one end of the gutter along a plane perpendicular to the longitudinal axis of the tubes so as to remove any variation in length of said plurality of tubes.

3. A method as defined in claim 1, further comprising fixing the plurality of remaining tube sections together at said one longitudinal end and fixing said second end of said monoblock bundle of laterally contiguous straight tube sections.

4. A method as in claim 3, wherein said cutting means is used to perform simultaneous cutting and fixing so that said step of making a second cut is simultaneous with said step of fixing the plurality of remaining tube sections and said step of fixing said second end of said monoblock bundle.

5. A method as in claim 3, further comprising cutting said monoblock bundle along a plane substantially perpendicular to the longitudinal axes of the laterally contiguous tube sections defining said monoblock bundle so as to define two bundles of tube sections each fixed together at only one end.

6. A method of manufacturing a monoblock bundle of laterally contiguous straight tube sections interconnected at a longitudinal end, comprising the steps of:

providing a gutter having a longitudinal axis, first and second substantially vertical side walls and a substantially vertical end wall, said end wall being disposed so as to be substantially perpendicular to said first and second side walls and being slidable along said longitudinal axis relative to said first and second side walls;

providing a plurality of elongated, straight and laterally contiguous tubes, each said tube having a longitudinal axis, said tubes being free from attachment to one another;

placing said plurality of elongated tubes into said gutter so that said longitudinal axes of said tubes are substantially parallel to said longitudinal axis of said gutter;

pressing said tubes disposed within said gutter vertically downwardly against one another;

moving said tubes longitudinally of said gutter so as to move said tubes longitudinally until said tubes protrude by a predetermined amount from one longitudinal end of said gutter;

providing means for cutting said tubes along a plane substantially perpendicular to the longitudinal axis of said tubes, including heated cutting means for simultaneously heating and cutting said tubes; and cutting ends of said tubes which protrude from said one end of said gutter along a plane substantially perpendicular to said longitudinal axis of said tubes with said heated cutting means to produce a plurality of straight tube sections of a particular length having one longitudinal end at said cut, and to simultaneously fix said tubes together at said cut so as to produce a monoblock bundle of laterally contiguous tube sections.

7. A process as defined in claim 6, wherein said step of cutting ends comprises making a first cut and further comprising the step of again moving said tubes longitudinally of said gutter so as to move the fixed tube sections longitudinally in the gutter until the fixed ends of said tubes protrude by a given length from said one longitudinal end of said gutter;

making a second cut in the same plane as the first cut to produce a plurality of remaining laterally contiguous straight tube sections of a same length having one longitudinal end at the second cut and another longitudinal end abutting said end wall and a monoblock bundle of laterally contiguous straight tube sections of a same length, fixed together at one end and having a second end at said second cut; and fixing the plurality of remaining tube sections together at said one longitudinal end and fixing said second end of said monoblock bundle of laterally contiguous straight tube sections.

8. A method as in claim 7, wherein said heated cutting means is used to perform said second cut so as to simultaneously fuse said second ends of said tube sections of said monoblock and said one end of said remaining tube sections.

9. A method of manufacturing a monoblock bundle of laterally contiguous straight tube sections interconnected at a longitudinal end, comprising the steps of:

providing a gutter having a longitudinal axis, first and second substantially vertical side walls and a substantially vertical end wall, said end wall being disposed so as to be substantially perpendicular to said first and second side walls and being slidable along said longitudinal axis relative to said first and second side walls;

providing a plurality of elongated, straight and laterally contiguous tubes, each said tube having a longitudinal axis, said tubes being free from attachment to one another;

placing said plurality of elongated tubes into said gutter so that said longitudinal axes of said tubes are substantially parallel to said longitudinal axis of said gutter;

pressing said tubes disposed within said gutter vertically downwardly against one another;

moving said tubes longitudinally of said gutter so as to move said tubes longitudinally until said tubes protrude by a predetermined amount from one longitudinal end of said gutter;

providing means for cutting said tubes along a plane substantially perpendicular to the longitudinal axis of said tubes;

cutting ends of said tubes which protrude from said one end of said gutter along a plane substantially perpendicular to said longitudinal axis of said tubes so as to produce a plurality of straight tube sections of a particular length having one longitudinal end at said cut;

fixing the plurality of tube sections together at said cut end so as to produce a monoblock bundle of laterally contiguous tube sections;

again moving said tubes longitudinally of said gutter so as to move the fixed tube sections longitudinally in the gutter until the fixed ends of said tubes protrude by a given length from said one end of said gutter;

making a second cut in a plane substantially perpendicular to the longitudinal axis of the tubes to produce a plurality of remaining laterally contiguous straight tube sections of a same length having one longitudinal end at the second cut and a monoblock bundle of laterally contiguous straight tube sections of a same length, fixed together at one end and having a second end at said second cut; and fixing the plurality of remaining tube sections together at said one longitudinal end and fixing said second end of said monoblock bundle of laterally contiguous straight tube sections.

10. A method of manufacturing a monoblock bundle of laterally contiguous straight tube sections interconnected at a longitudinal end, comprising the steps of:

providing a gutter having a longitudinal axis, first and second substantially vertical side walls and a substantially vertical end wall, said end wall being disposed substantially perpendicular to said first and second side walls and being slidable along said longitudinal axis of said gutter relative to said first and second side walls;

providing a plurality of elongated, straight and laterally contiguous tubes, each said tube having a longitudinal axis, said tubes being free from attachment to one another;

placing said plurality of elongated tubes into said gutter so that said longitudinal axes of said tubes are substantially parallel to said longitudinal axis of said gutter;

pressing said tubes disposed within said gutter vertically downwardly against one another;

moving said end wall of said gutter longitudinally relative to said side walls of said gutter so as to move said tubes longitudinally until said tubes protrude by a predetermined amount from one longitudinal end of said gutter;

providing means for cutting said tubes along a plane substantially perpendicular to the longitudinal axis of said tubes;

cutting ends of said tubes which protrude from said one end of said gutter along a plane substantially perpendicular to said longitudinal axis of said tubes so as to produce a plurality of straight tube sections of a particular length having one longitudinal end at said cut and another longitudinal end abutting said end wall of said gutter; and fixing the plurality of tube sections together at said cut end so as to produce a monoblock bundle of laterally contiguous tube sections.

11. A method as in claim 10, wherein said step of providing means for cutting comprises providing cutting means for simultaneously cutting and fixing said tubes and wherein said step of cutting said tubes and said step of fixing said tubes are performed simultaneously by cutting said tubes with said cutting means.

12. A method as in claim 10, wherein said step of providing means for cutting comprises providing heated cutting means for simultaneously heating and cutting said tubes and wherein said step of cutting said tubes and said step of fixing said tubes are performed simultaneously by cutting said tubes with said heated cutting means.

13. A method as in claim 12, wherein said heated cutting means comprises a heated filament.

14. A method as in claim 13, further comprising the step of reciprocating the heated filament along a longitudinal axis thereof.

15. A method as in claim 10, wherein the step of fixing proceeds the step of cutting.

16. A method as in claim 10, wherein the step of fixing comprises applying a layer of permeable material to at least one longitudinal end of said tubes and heating said ends so that the material of said ends penetrates said layer of permeable material.

17. A method as in claim 10, wherein said step of fixing comprises applying a layer containing a bonding agent to at least one longitudinal end of said tubes.

18. A method as in claim 17, wherein the bonding agent is a thermofusible agent.

* * * * *